(12) United States Patent
Yin et al.

(10) Patent No.: US 7,446,834 B2
(45) Date of Patent: Nov. 4, 2008

(54) LIQUID CRYSTAL DISPLAY DEVICE HAVING REFRACTION PATTERN ALIGNED WITH BLACK MATRIX THEREOF

(75) Inventors: Fei Yin, Shenzhen (CN); Kai Meng, Shenzhen (CN)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 0 days.

(21) Appl. No.: 11/811,592

(22) Filed: Jun. 11, 2007

(65) Prior Publication Data

US 2007/0285610 A1  Dec. 13, 2007

(30) Foreign Application Priority Data

Jun. 9, 2006  (TW)  ............... 95120551 A (51) Int. Cl.
  *G02F 1/1333* (2006.01)
  *G02F 1/1335* (2006.01)
(52) U.S. Cl. ............... 349/110; 349/61; 349/62; 349/158; 349/160
(58) Field of Classification Search ........... 349/110
  See application file for complete search history.

(56) References Cited

U.S. PATENT DOCUMENTS

| | | | | |
|---|---|---|---|---|
| 5,666,176 A | * | 9/1997 | Kurematsu | ............ 349/95 |
| 6,323,920 B1 | * | 11/2001 | Kim | ............ 349/106 |
| 6,537,817 B1 | * | 3/2003 | Papen | ............ 436/49 |
| 6,577,358 B1 | * | 6/2003 | Arakawa et al. | ............ 349/57 |
| 6,989,874 B2 | * | 1/2006 | Chae | ............ 349/95 |
| 7,018,061 B2 | | 3/2006 | Chen | |
| 7,039,286 B2 | | 5/2006 | Leu et al. | |
| 2003/0063241 A1 | * | 4/2003 | Matsumoto et al. | ......... 349/110 |
| 2003/0122999 A1 | * | 7/2003 | Chae | ............ 349/110 |
| 2005/0140846 A1 | * | 6/2005 | Lubart et al. | .......... 349/62 |
| 2006/0114378 A1 | * | 6/2006 | Choi | ............ 349/110 |

* cited by examiner

*Primary Examiner*—Frank G Font
*Assistant Examiner*—Mary A El Shammaa
(74) *Attorney, Agent, or Firm*—Wei Te Chung (57) ABSTRACT

An exemplary liquid crystal panel (7) of liquid crystal display device (2) is provided. The liquid crystal panel (7) has a pair of substrates (21, 23) and a liquid crystal layer (22) disposed between the substrates. The liquid crystal panel (7) further includes: a first pattern (233,240) disposed on a first inner surface (212,232) of one of the pair of substrates, and a second pattern (230) aligned with the first pattern (233,240), and the second pattern (230) provided at an outer surface (231) of one of the pairs of the substrates. Wherein, the second pattern (230) has a predetermined inclined angle to emit light beams bypass the first pattern as to increase light utilization ratio.

11 Claims, 9 Drawing Sheets

LIQUID CRYSTAL DISPLAY DEVICE HAVING REFRACTION PATTERN ALIGNED WITH BLACK MATRIX THEREOF

BACKGROUND OF THE INVENTION

1. Field of the Invention

The present invention relates to a liquid crystal panel of a liquid crystal display device, and particularly to a liquid crystal panel configured to efficiently utilize light provided thereto.

2. General Background

A liquid crystal panel of a liquid crystal display device does not provide its own illumination. Therefore an artificial light source is provided with a liquid crystal panel, or the liquid crystal panel relies on ambient light. The artificial light source is typically a backlight module, which provides light beams having a desired brightness and uniform distribution.

Figure 16:
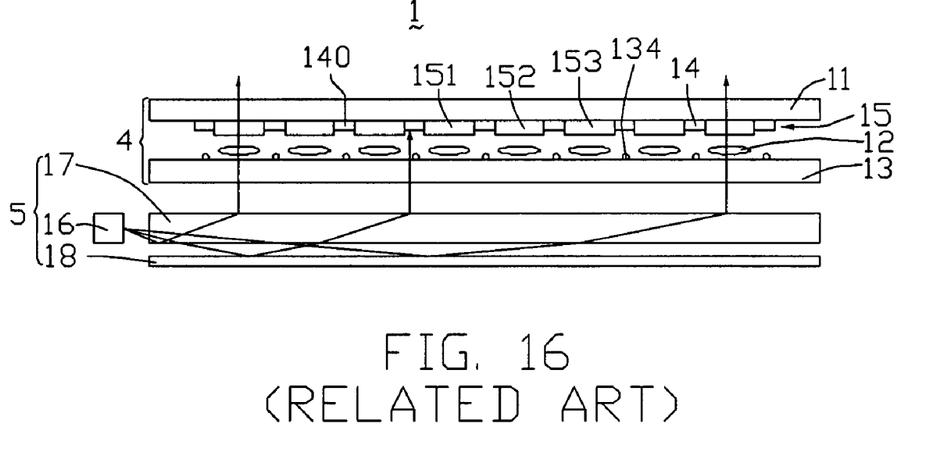
FIG. 16 is an exploded, side cross-sectional view of a conventional liquid crystal display device.

Referring to FIG. 16, an exploded, side cross-sectional view of a conventional liquid crystal display device is shown. The liquid crystal display device 1 includes a liquid crystal panel 4 and a backlight module 5. The backlight module 5 is aligned with the liquid crystal panel 4 to uniformly illuminate the liquid crystal panel 4.

The liquid crystal panel 5 includes a pair of substrates, such as an upper glass substrate 11 and a lower glass substrate 13 located opposite to the upper glass substrate 11. A liquid crystal layer 12 is disposed between the substrates 11 and 13. A color filter layer 15 and a black matrix layer 14 are individually formed on an inner side of the upper glass substrate 11. A plurality of metal lines 134 are formed on an inner side of the lower glass substrate 13.

Figure 17:
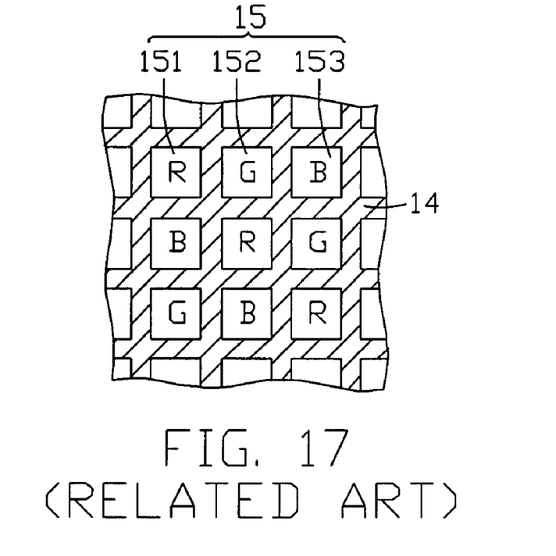
FIG. 17 is an enlarged, top plan view of part of a color filter layer and a black matrix layer of the liquid crystal display device of FIG. 16.

Referring also to FIG. 17, this is an enlarged, top plan view of part of the color filter layer 15 and the black matrix layer 14 of the liquid crystal display device 1. The color filter layer 15 includes a plurality of red color filter units (R) 151, a plurality of green color filter units (G) 152, and a plurality of blue color filter units (B) 153. The black matrix layer 14 includes a plurality of black matrix units 140 that fill spaces between the red color filter units (R) 151, the green color filter units (G) 152, and the blue color filter units (B) 153. A material of the black matrix layer 14 is a non-transparent resin. Thereby, light leakage is avoided, and a contrast of the liquid crystal display device 1 is enhanced. Thus the purity of colors displayed by the liquid crystal display device 1 can be enhanced.

The backlight module 5 normally includes a light source 16, a light guide plate 17, and a reflective sheet 18. The light source 16 emits light beams to the light guide plate 17. The light beams transmit and reflect inside the light guide plate 17, and light beams that escape from a bottom of the light guide plate 17 are reflected by the reflective sheet 18 back into the light guide plate 17. Overall, a top surface of the light guide plate 17 provides planer light beams to the liquid crystal panel 4. In general, the light beams directly transmit through the lower glass substrate 13, the liquid crystal layer 12, the color filter layer 15, and the upper glass substrate 11. However, a portion of light beams are shielded by the black matrix layer 14. This can result in the liquid crystal display device 1 having a low brightness and a low light utilization ratio. Hence, there is a need for a liquid crystal panel and a corresponding liquid crystal display device which can overcome the above-mentioned problems.

SUMMARY

In one aspect, a liquid crystal panel is provided. The liquid crystal panel has a pair of substrates and a liquid crystal layer disposed between the substrates. The liquid crystal panel includes: a first pattern disposed on a first inner surface of one of the pairs of the substrates, a second pattern aligned with the first pattern, and the second pattern provided at an outer surface of one of the pairs of the substrates.

Furthermore, the second pattern is disposed at the coating layer, which is disposed at the outer surface of said one of the pair of the substrates.

In another aspect, a liquid crystal display device of the foregoing liquid crystal panel is provided. The liquid crystal display device has a backlight module adjacent to the liquid crystal panel, for providing light source. Wherein, the backlight module has a reflective sheet disposed on one side of the backlight module, far from the liquid crystal panel. Furthermore, a polarized sheet is disposed between the backlight module and the liquid crystal panel.

Unlike in the prior art, the specific second pattern is formed on the outer surface of one of the pairs of the substrates and aligned with the first pattern. Wherein, the second pattern has a predetermined inclined angle to emit light beams bypass the first pattern. That is, parts of the light beams change transmitting paths, so what is being transmitted is away from a non-transparent black matrix layer and a plurality of metal lines, to increase light utilization ratio.

Embodiments of the present invention can be better understood by reading the subsequent detailed description and examples with references being made to the accompanying drawings.

BRIEF DESCRIPTION OF THE DRAWINGS

In the drawings, all the views are schematic.

DETAILED DESCRIPTION

Hereinafter, preferred and exemplary embodiments of the present invention will be described with reference being made to the attached drawings.

Figure 1:
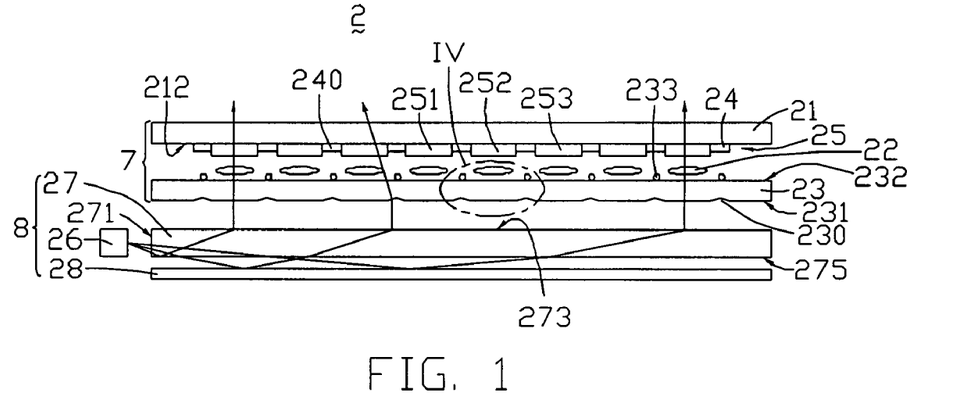
FIG. 1 is an exploded, side cross-sectional view of a liquid crystal display device according to a first embodiment of the present invention.

FIG. 1 is an exploded, schematic, side cross-sectional view of a liquid crystal display device 2 of a first embodiment of the present invention. The liquid crystal display device 2 includes a liquid crystal panel 7 and a backlight module 8. The back light module 8 is aligned with the liquid crystal panel 7, and provides uniform light beams to the liquid crystal panel 7.

The liquid crystal panel 7 includes a pair of substrates such as an upper glass substrate 21 and a lower glass substrate 23 opposite to the upper glass substrate 21. A liquid crystal layer 22 is disposed between the substrates 21, 23. A pattern is defined at an inner surface 212, 232 of each of the substrates 21, 23. The pattern of the upper glass substrate 21 is defined by a plurality of black matrix units 240 formed on the inner surface 212 thereof. The pattern of the lower glass substrate 23 is defined by a plurality of metal lines 233 formed on the inner surface 232 thereof. The pattern of the upper glass substrate 21 corresponds to the pattern of the lower glass substrate 23. Further, an outer surface 231 of the lower glass substrate 23 has a specific light bending pattern formed thereat. The light bending pattern corresponds to each of the patterns of the inner surfaces 212, 232 of the substrates 21, 23. The light bending pattern of the lower glass substrate 23 is configured to alter transmission paths of light beams such that the light beams travel in predetermined directions. Thereby, a rate of utilization of the light beams can be increased. In addition, the light bending pattern can be in the form of trenches or protrusions. The trenches or protrusions are aligned with the pattern formed by the plurality of metal lines 233 of the lower glass substrate 23, and/or with the pattern formed by the plurality of black matrix units 240 of the upper glass substrate 21.

Figure 2:
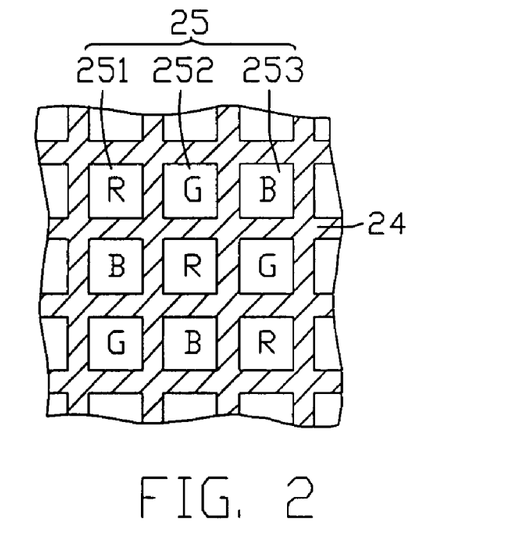
FIG. 2 is an enlarged, top plan view of part of a color filter layer and a black matrix layer of the liquid crystal display device of FIG. 1.

Referring also to FIG. 2, this is a schematic, enlarged, top plan view of part of a color filter (CF) layer 25 and a black matrix (BM) layer 24 of the liquid crystal display device 2. The black matrix layer 24 is formed on the inner surface 212 of the upper glass substrate 21, and includes the black matrix units 240. The color filter layer 25 is also formed on the inner surface 212 of the upper glass substrate 21, and includes a plurality of red (R) color filter units 251, a plurality of green (G) color filter units 252, and a plurality of blue (B) color filter units 253. The black matrix layer 24 is a kind of non-transparent resin layer. The black matrix units 240 of the black matrix layer 24 fill individual spaces between adjacent of the red color filter units 251, the green color filter units 252, and the blue color filter units 253. Furthermore, a first predetermined pattern on the inner surface 212 of the upper glass substrate 21 is defined by the plurality of black matrix units 240.

Figure 3:
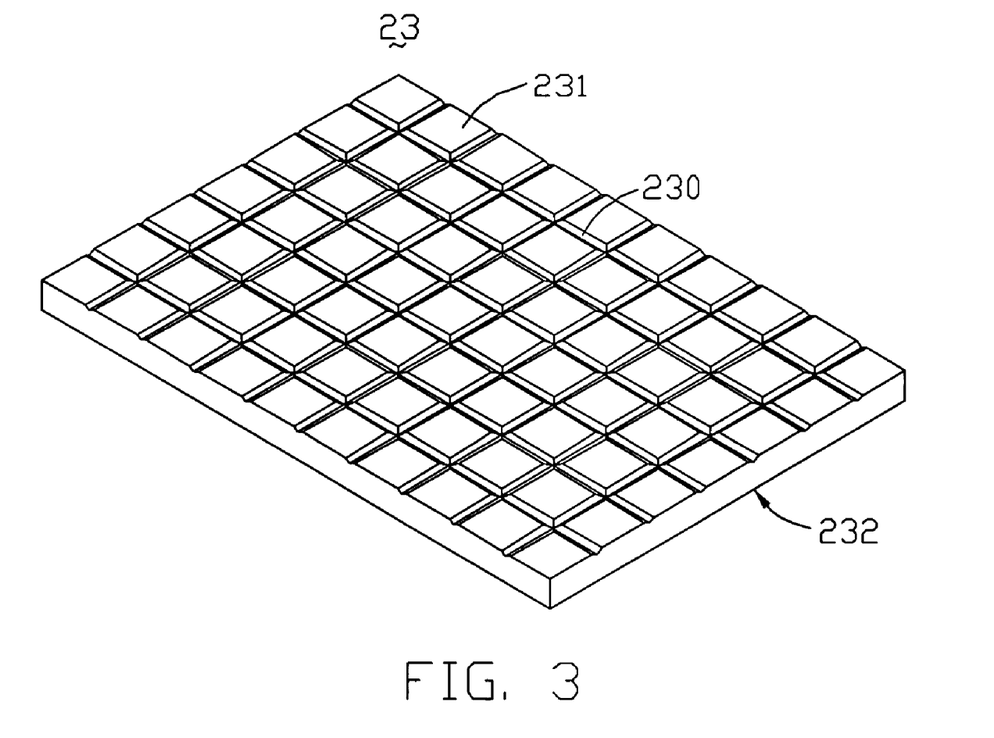
FIG. 3 is an inverted, isometric view of a lower glass substrate of the liquid crystal display device of FIG. 1.

The lower glass substrate 23 includes the inner surface 232 adjacent the liquid crystal layer 22 and the outer surface 231 opposite to the inner surface 232. In the preferred embodiment, a second predetermined pattern is formed on the inner surface 232 and a third predetermined pattern is formed on the outer surface 231. The second predetermined pattern is a kind of non-transparent layer, such as the plurality of metal lines 233, i.e. address lines for thin film transistor structures. The third predetermined pattern can be a plurality of trenches 230, as shown in FIG. 3. The third predetermined pattern is aligned with at least one of the first predetermined pattern, i.e. BM layer 24 of the upper glass substrate 21 and the second predetermined pattern, i.e. metal lines 233 of the lower glass substrate 23. That is, the plurality of trenches 230 of the outer surface 231 of the lower glass substrate 23 can be corresponding to either positions of the plurality of the black matrix units 240 on the inner surface 212 of the upper glass substrate 21 or positions of the plurality of the metal lines 233 on the inner surface 212 of the lower glass substrate 23. Furthermore, projections of the plurality of trenches 230, the plurality of metal lines 233, and the plurality of black matrix units 240 are located, substantially, at same positions. All are arranged in the matrix. That is, the plurality of trenches 230 is arranged in the form of a grid.

The black matrix layer 24 is used to shield the reflection of light beams from the metal lines 233, for avoiding light mixing and light leakage. That is, a transverse cross-sectional area of one of the black matrix units 240 is wider than that of the corresponding metal lines 233.

Also referring to FIG. 1, the backlight module 8 includes a light source 26, a light guide plate 27, and a reflective sheet 28. The light guide plate 27 has an incident surface 271, an emitting surface 273 orthogonal to the incident surface 271, and a bottom surface 275 opposite to the emitting surface 273.

In addition, an included angle between the bottom surface 275 and the incident surface 271 is no greater than 90 degrees. In other words, the bottom surface 275 can be perpendicular to the incident surface 271 or inclined to a direction distant from the light source 26.

The light source 26 is positioned adjacent the incident surface 271 of the light guide plate 27 to emit light beams thereto. Most of the light beams are reflected from the bottom surface 275 of the light guide plate 27 and directed to the liquid crystal panel 7 through the emitting surface 273 of the light guide plate 27. Thus, the liquid crystal panel 7 obtains uniform light beams which are substantially perpendicular thereto. The reflective sheet 28 is positioned adjacent the bottom surface 275 of the light guide plate 27 and is used to reflect the light beams which are refracted from the bottom surface 275, the purpose for refraction is to reuse the above-mentioned light beams.

The light beams emitted into the liquid crystal panel 7 are divided into two parts. One part of the light beams is directly emitted to the liquid crystal layer 22, the color filter layer 25, and the upper glass substrate 21 through the normal surface of the lower glass substrate 23. The other part of the light beams is refracted via the third predetermined pattern (such as the trenches 230) and then is emitted to the liquid crystal layer 22, the color filter layer 25, and the upper glass substrate 21, wherein the third predetermined pattern is used for keeping away from the plurality of metal lines 233 and the plurality of black matrix units 240.

Figure 4:
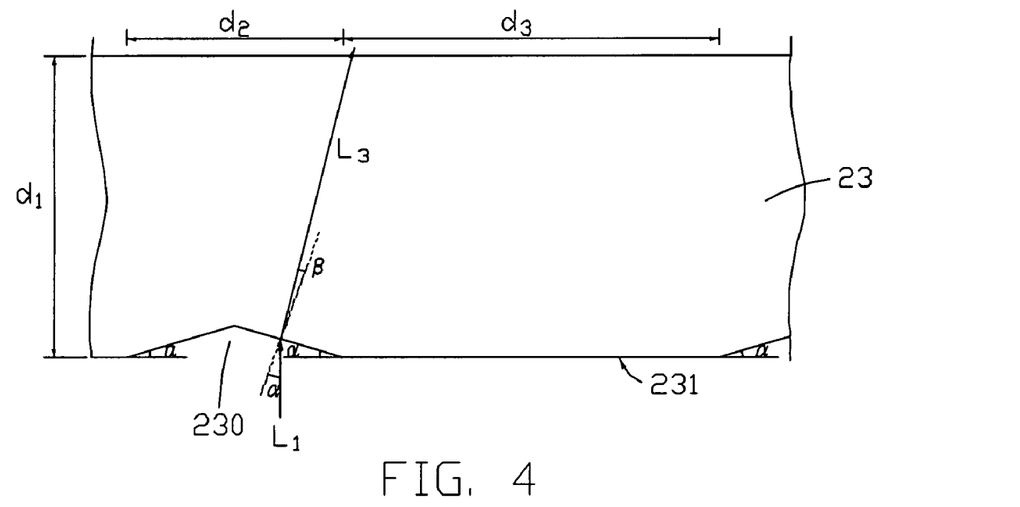
FIG. 4 is an enlarged view of part of the lower glass substrate of the liquid crystal display device of FIG. 1, corresponding to a marked elliptical region IV thereof.

Referring also to FIG. 4, this is a schematic, enlarged view of part of a marked region IV of FIG. 1. Since the thickness of the upper glass substrate 21 and the lower substrate 23 is far greater than the gap there-between, the thickness of the liquid crystal layer 22 can be ignored.

As shown in FIG. 4, in a preferred embodiment of the present invention, a transverse cross-sectional area of at least one of the trenches 230 is an isosceles triangle. Each of the bottom surfaces of the trenches 230 is at the same level to the outer surface 231 of the lower glass substrate 23. Furthermore, at least one of the trenches 230, with the isosceles triangular shape, includes two equal bottom angles α. Additionally, a thickness of the lower glass substrate 23 is d1, a width of the black matrix unit 240 corresponding to the trench 230 is d2, and a distance between any two adjacent black matrix units 240 is d3. When the incident direction of the light beams L1 is substantially perpendicular to the lower glass substrate 23, the incident angle at the side wall of the trench 230 is α and the emitting light beams is L3. Therefore, the refractive angle thereof is β.

Take a small size product for example, such as a panel of cell phones. When the refraction index n is 1.5, the thickness of the lower glass substrate 23 d1 is 0.5 mm, the width of the black matrix unit 240 corresponding to the trench 230 d2 is 0.02 mm, and the distance between any two adjacent black matrix units 240 d3 is 0.05 mm. According to refraction theory:

$N = \sin α / \sin β;$ $0.5\ d2/d1 < \tg(α-β) < (0.5\ d2+d3)/d1$

Thus, as the incident angle α is ranged between 4~17 degrees, the light beams which are perpendicular to the trenches 230 are refracted, steered clear of the metal lines 233 and the black matrix units 240, and emitted through the liquid crystal layer 22 and the color filter layer 25.

In general, some of the light beams are emitted to the plurality of metal lines 233 and the plurality of black matrix units 240. However, unlike the prior art, the foregoing lighted beams will be refracted, and then the light beams can be emitted through the color filter layer 25. In the other words, the specific light bending pattern has portions such as the trenches 230 of the outer surface 231, each of which portions has a predetermined inclined angle α. Therefore incoming light beams which pass through the trenches 230 proceed to bypass the metal lines and the black matrix units to emit from the upper glass substrate 21. This enhances a utilization ratio of incident light beams that are perpendicular to the liquid crystal panel 7.

Figure 5:
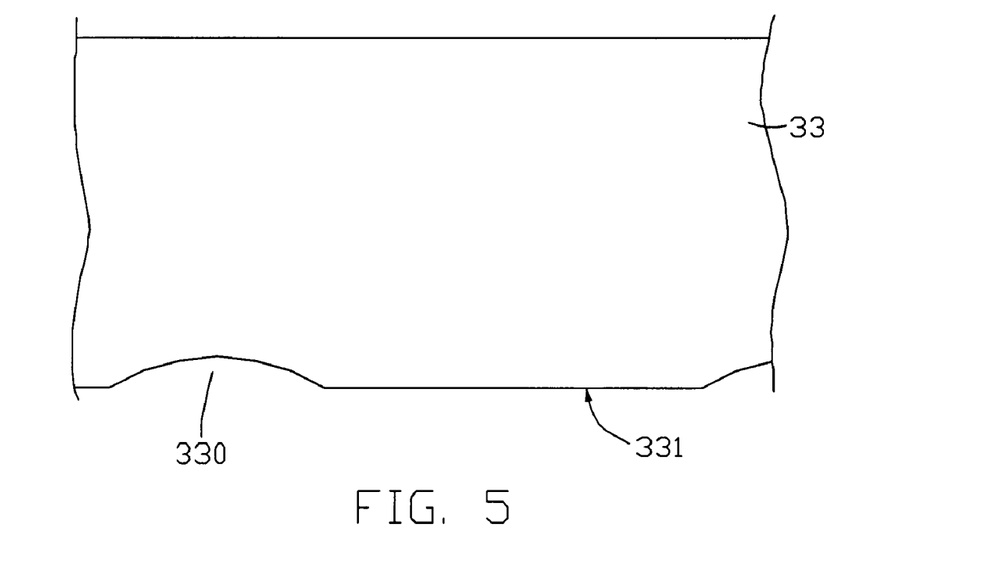
FIG. 5 is a side cross-sectional view of part of a lower glass substrate of a liquid crystal display device according to a second embodiment of the present invention.

Referring FIG. 5, this is a side cross-sectional view of a part of a lower glass substrate of a liquid crystal display device according to a second embodiment of the present invention. Compared with the lower glass substrate 23 of the first embodiment of FIG. 4, a lower glass substrate 33 of the liquid crystal panel 7 has an outer surface 331 with a plurality of arc-shaped trenches 330 corresponding to a pattern defined by either the plurality of the black matrix units (not shown) or the plurality of the metal lines (not shown), wherein the curvature of each one of the plurality of the arc-shaped trenches 330 is defined according to the refraction theory. Similarly, each of the arc-shaped trenches 330 has a predetermined inclined angle such that incoming light beams which pass through the angled trenches bypass the metal lines and the black matrix units to emit from said one of the pair of the substrates. In the other word, the light bending pattern (such as the arc-shaped trench 330) makes the light beams refracted at a surface of the arc-shaped trenches 330, and alters their optical paths to pass the transparent layer (such as color filter layer, not shown) and to emit thereof.

Figure 6:
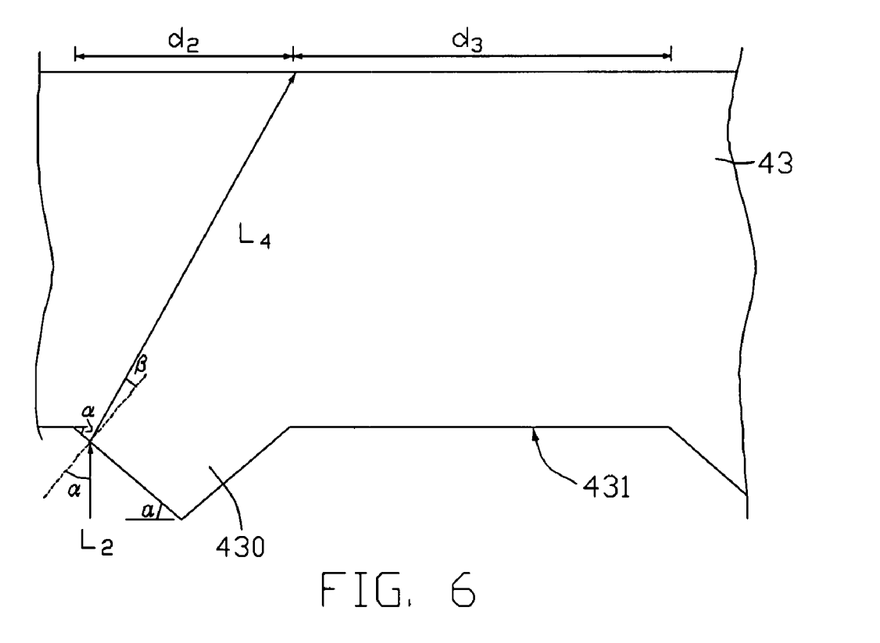
FIG. 6 is a side cross-sectional view of part of a lower glass substrate of a liquid crystal display device according to a third embodiment of the present invention.

Referring FIG. 6, this is a side cross-sectional view of a part of a lower glass substrate of a liquid crystal display device according to a third embodiment of the present invention. Compared with the lower glass substrate 23 of the first embodiment of FIG. 4, a light bending pattern includes a plurality of protrusions 430 of the outer surface 431 of a lower glass substrate 43 each of which protrusions 430 has a predetermined inclined angle such that incoming light beams which pass through the angled protrusions 430 bypass the non-transparent layer to emit from said one of the pair of the substrates. Wherein the plurality of protrusions 430 is aligned with at least one of a black matrix layer (not shown) and an array structure formed by a plurality of metal lines (not shown). In addition, a transverse cross-sectional area of at least one of the protrusion 430 can be the shape of a triangle. The protrusion 430 can be elongated to form a triangular prism on the outer surface 431 of the lower substrate 43. Furthermore, an inclined angle α is between the protrusion 430 and an extending horizontal line of the outer surface 431 of the lower glass substrate 43. When the incident direction of the light beams L2 is substantially perpendicular to the lower glass substrate 43, the incident angle at the side wall of the protrusion 430 is α, the emitting light beams is L4, and the refractive angle thereof is β. Accordingly, the above-mentioned refraction theory is adopted, and then estimates are taken for a suitable inclined angle α of the protrusions 430 to change the optical paths of the light beams to only pass through desired portions (such as a color filter layer, not shown) of a transparent substrate and emit therefrom.

Figure 7:
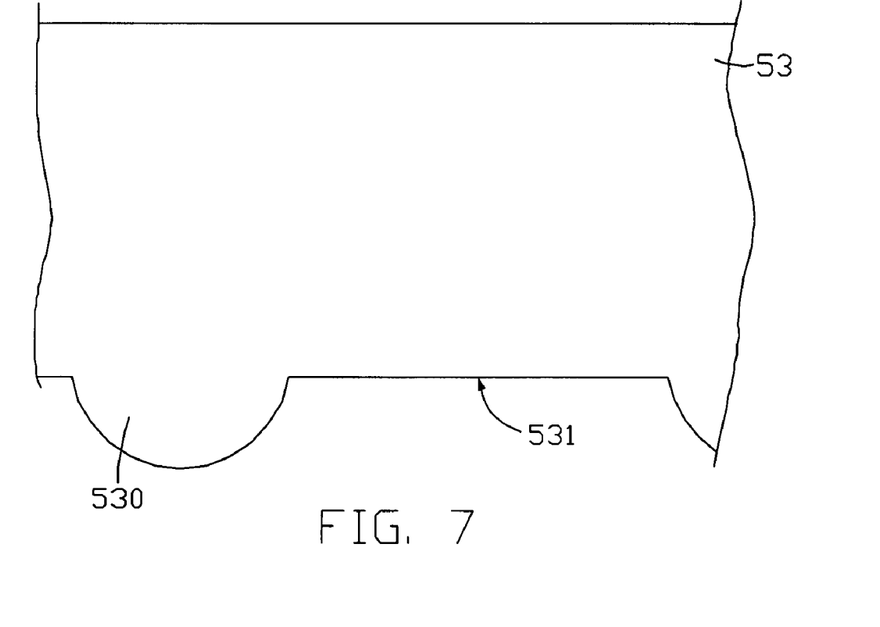
FIG. 7 is a side cross-sectional view of part of a lower glass substrate of a liquid crystal display device according to a fourth embodiment of the present invention.

Referring FIG. 7, this is a side cross-sectional view of a part of a lower glass substrate of a liquid crystal display device according to a fourth embodiment of the present invention. Compared with the lower glass substrate 43 of the third embodiment of FIG. 6, a light bending pattern includes a plurality of arc-shaped protrusions 530 of the outer surface 531 of a lower glass substrate 53 each of which arc-shaped protrusions 530 has a predetermined inclined angle such that incoming light beams which pass through the angled protrusions 530 bypass the non-transparent layer to emit from said one of the pair of the substrates. Wherein the plurality of arc-shaped protrusions 530 corresponding to at least one of a black matrix layer (not shown) and an array structure formed by a plurality of metal lines (not shown). The curvature of each one of the plurality of arc-shaped protrusions 530 is defined according to refraction theory. Similarly, the arc-shaped protrusions 530 make the light beams to be refracted according the inclined angle thereof and change their transmission paths to pass transparent layer (such as a color filter layer, not shown) and to emit thereof. In addition, the arc-shaped protrusions 530 can be elongated to form a semi-cylinder on the outer surface 531 of the lower substrate 53 as the concept of viewing the situation as a whole.

FIGS. 8-11 show side cross-sectional views of parts of lower glass substrates of liquid crystal display devices according to a fifth through a eighth embodiments of the present invention. The difference between the first embodiment and the following embodiments is that the following embodiments further introduce a coating layer formed on an outer surface of the lower substrate. The coating layer has a specific pattern corresponding with at least one of a first predetermined pattern (such as a plurality of black matrix units, not shown) of an upper glass substrate and a second predetermined pattern (such as a plurality of metal lines, not shown) of a lower glass substrate.

Figure 8:
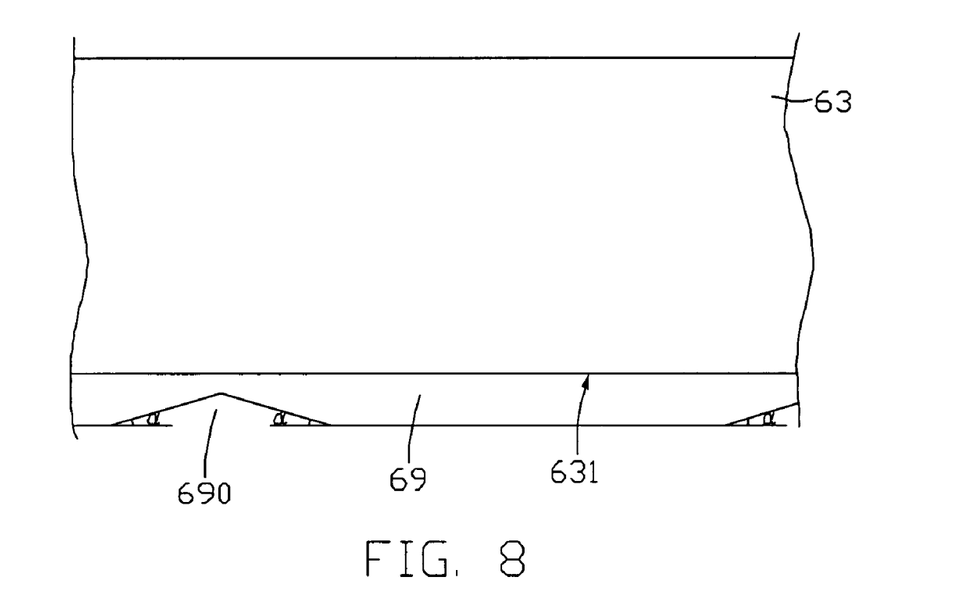
FIG. 8 is a side cross-sectional view of part of a lower glass substrate of a liquid crystal display device according to a fifth embodiment of the present invention.

As shown in FIG. 8, a coating layer 69 is uniformly located on an outer surface 631 of a lower substrate 63 of a liquid crystal panel. A plurality of triangular-shaped trenches 690 are formed within the coating layer 69. The plurality of triangular-shaped trenches 690 correspond to either or both of a pattern of black matrix units (not shown) and a pattern of metal lines (not shown). In other words, the position of any one of the triangular-shaped trenches 690 is aligned with one of the corresponding black matrix units (not shown) and/or one of the corresponding metal lines (not shown).

In addition, the refraction index of the coating layer 69 is preferred near to that of the substrate. Thus, as the substrate is a glass substrate, the coating layer can be selected from the group of silicon dioxide ($SiO_2$), silicon nitride (SiNx), polyethylene terephthalate (PET), polystyrene (PS), steatic acid (SA), polymethylmethacrylate (PMMA), phosphoryicholine (PC), polypropylene (PP), polyethylene (PE), polyvinyl chloride (PVC), pqlyiniide (PI), triacetate fiber (TAC), polymer of methymesylate-styrene (MS), fluorinated acrylic ester, methyl acrylate, magnesium fluoride($MgF_2$), and so on.

However, a kind of material has a characteristic which is independent on the influence of optical polarization, it can be adopted as the coating layer whether the refraction index is larger or smaller than that of the substrate.

Figure 9:
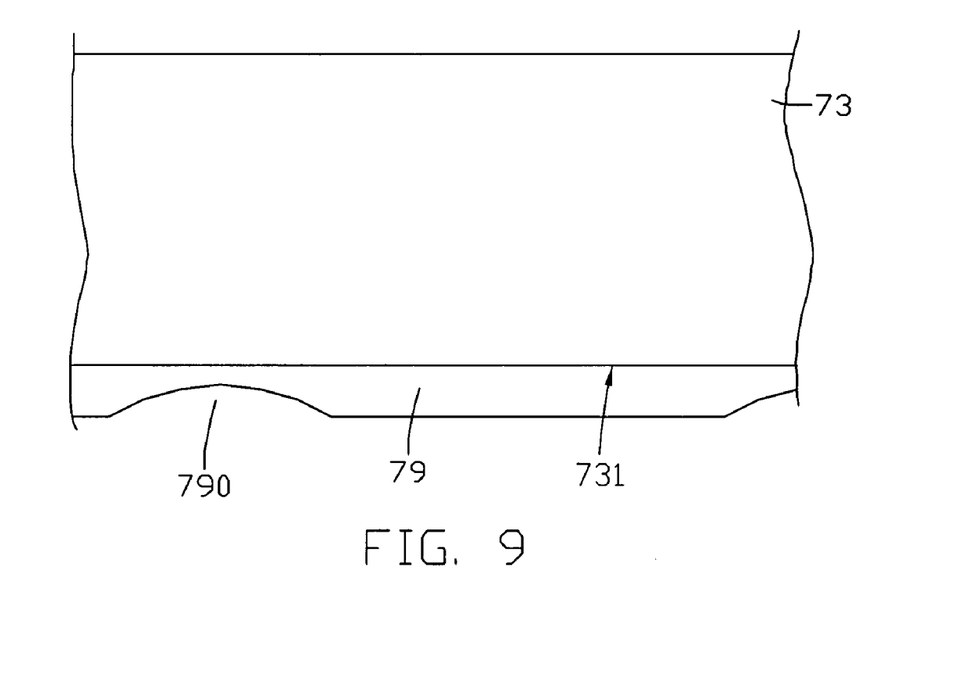
FIG. 9 is a side cross-sectional view of part of a lower glass substrate of a liquid crystal display device according to a sixth embodiment of the present invention.

In addition, a specific pattern of a coating layer 79 disposed on an outer surface 731 of a substrate 73 can be formed by a plurality of trenches 790, as shown in FIG. 9. A transverse cross-sectional area of at least one of the trenches 790 can be an arc-shaped cavity.

Figure 10:
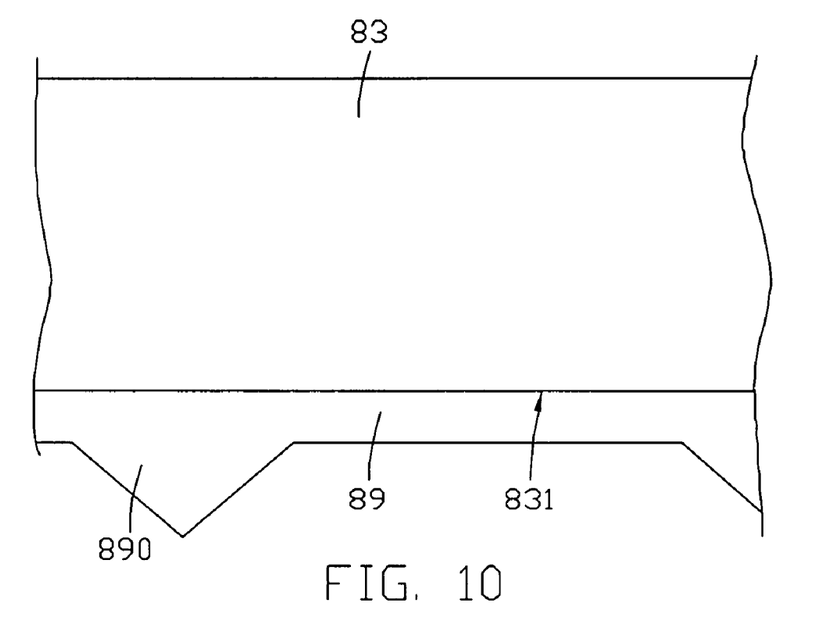
FIG. 10 is a side cross-sectional view of part of a lower glass substrate of a liquid crystal display device according to a seventh embodiment of the present invention.

In addition, a specific pattern of a coating layer 89 disposed on an outer surface 831 of a substrate 83 can be formed by a plurality of protrusions 890, as shown in FIG. 10. And a transverse cross-sectional area of at least one of the protrusion 890 can be the shape of a triangle. The triangular-shaped protrusion 890 can be elongated to form a triangular prism on the outer surface 831 of the lower substrate 83.

Figure 11:
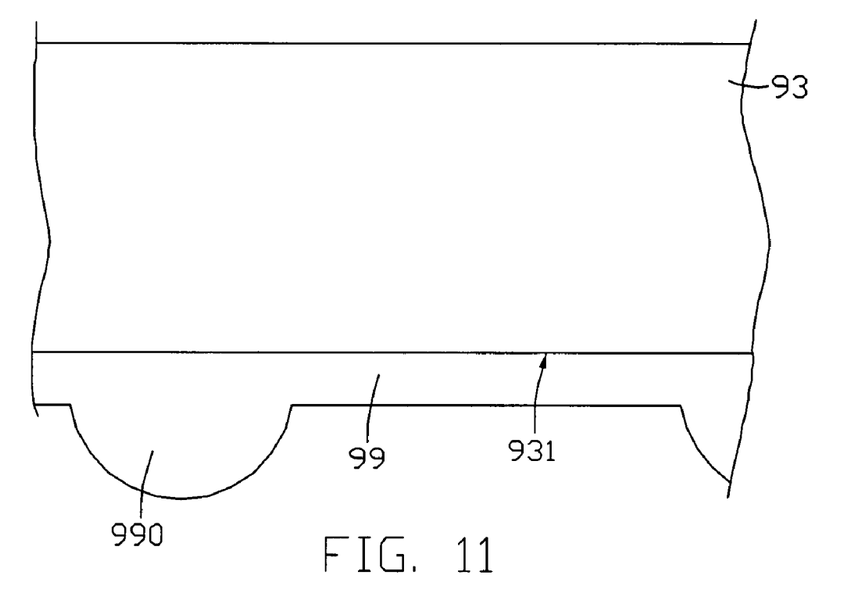
FIG. 11 is a side cross-sectional view of part of a lower glass substrate of a liquid crystal display device according to an eighth embodiment of the present invention.

In addition, a specific pattern of a coating layer 99 disposed on an outer surface 931 of a lower substrate 93 can be formed by a plurality of arc-shaped protrusions 990, as shown in FIG. 11. As the concept of viewing the situation as a whole, the arc-shaped protrusion 990 can be elongated to form a semi-cylinder on the outer surface 931 of the lower substrate 99.

Furthermore, a filling layer is introduced to provide a planar outer surface of a substrate. That is, the filling layer is filled into the above-mentioned opening structure (such as a plurality of trenches, a plurality of protrusions) whereby a planar surface is formed at the outer surface to make the substrate tightly adhere to a polarizer sheet.

Figure 12:
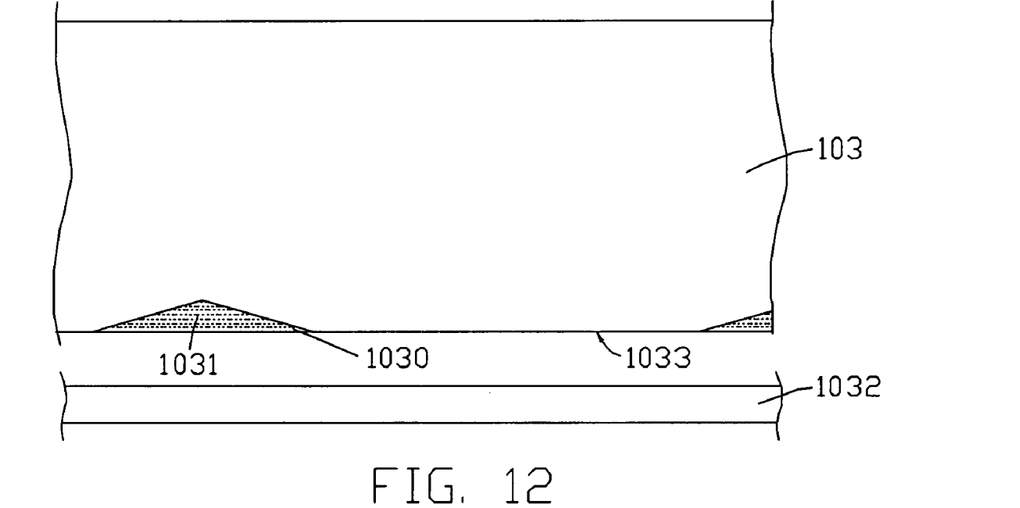
FIG. 12 is a side cross-sectional view of part of a lower glass substrate of a liquid crystal display device according to a ninth embodiment of the present invention.

An example according to the above-mentioned structure is illustrated below. Referring to FIG 12, this is a side cross-sectional view of part of a lower glass substrate of a liquid crystal display device according to the ninth embodiment of the present invention. A lower substrate 103 has a plurality of trenches 1030 and a filling layer 1031 filled therein. The liquid crystal display device (not shown) further includes a polarizer sheet 1032 disposed at a side of an outer surface 1033 of the liquid crystal panel (not shown). In other words, a planarization surface is formed by the combination of the plurality of trenches 1030 with the filling layer 1031. Thus, the adherence between the lower substrate 103 and the polarizer sheet 1032 can enhance due to the planarization surface of the lower substrate 103. The refraction index of the filling layer 1031 is larger than that of air and smaller than that of glass. In a preferred embodiment, the material of the tilling layer 1031 can be made of fluorinated acrylic ester, methyl acrylate, magnesium fluoride ($MgF_2$), and so on. That is, the light beams are refracted at the cross-area of the filling layer 1031 and the lower glass substrate 103.

Figure 13:
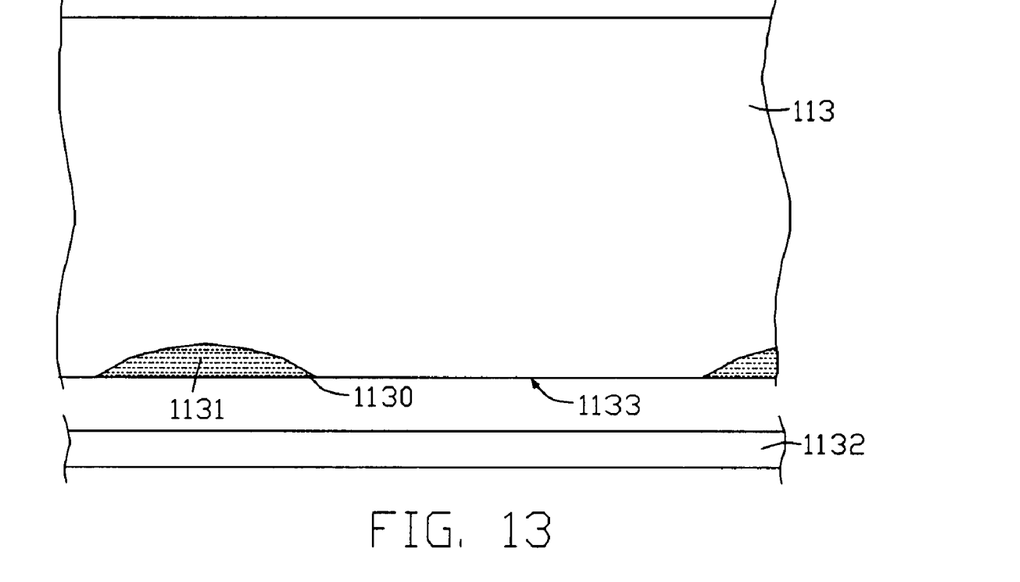
FIG. 13 is a side cross-sectional view of part of a lower glass substrate of a liquid crystal display device according to a tenth embodiment of the present invention.

In addition, a filling layer 1131 disposed on an outer surface 1133 of a substrate 113 fills up a plurality of arc-shaped trenches 1130 on the ground according to the tenth embodiment of the present invention of FIG. 13. Therefore, a polarizer sheet 1132 is tightly adhered to the lower substrate 113 and dependent on the planar adhering surfaces between thereof.

Figure 14:
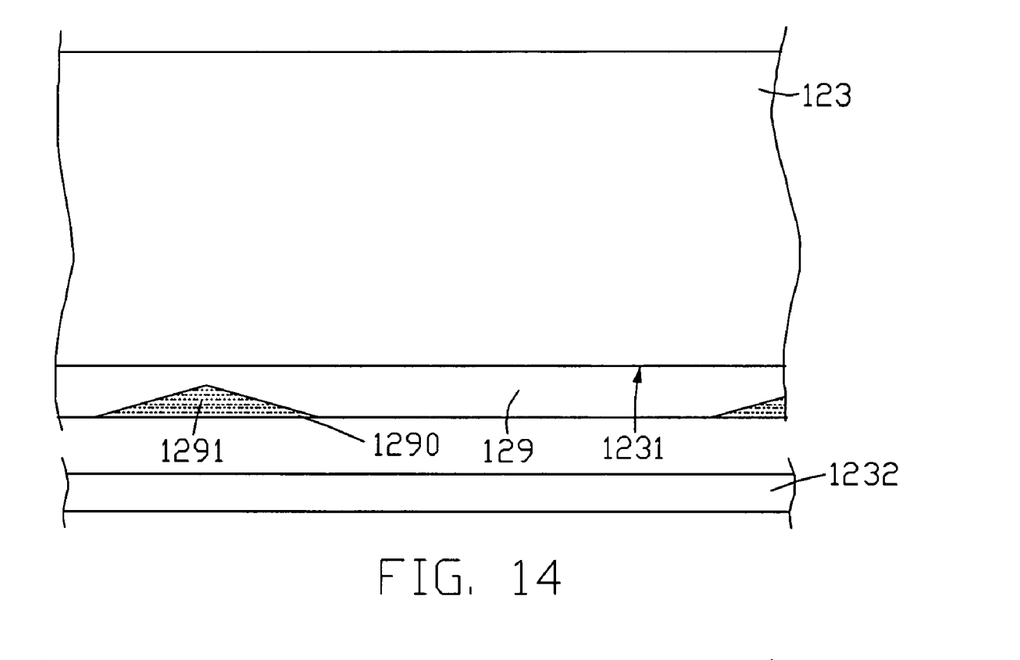
FIG. 14 is a side cross-sectional view of part of a lower glass substrate of a liquid crystal display device according to an eleventh embodiment of the present invention.

Similarly, a filling layer is introduced into the structure of the fifth embodiment of the present invention of FIG. 8. Also referring to FIG. 14, a plurality of triangular-shaped trenches 1290 of a coating layer 129 is filled with a filling layer 1291 and leveled up. Therefore, a polarizer sheet 1232 can be tightly adhered to a planar outer surface 1231 of the coating layer 129 and the filling layer 1291 on the lower substrate 123.

Figure 15:
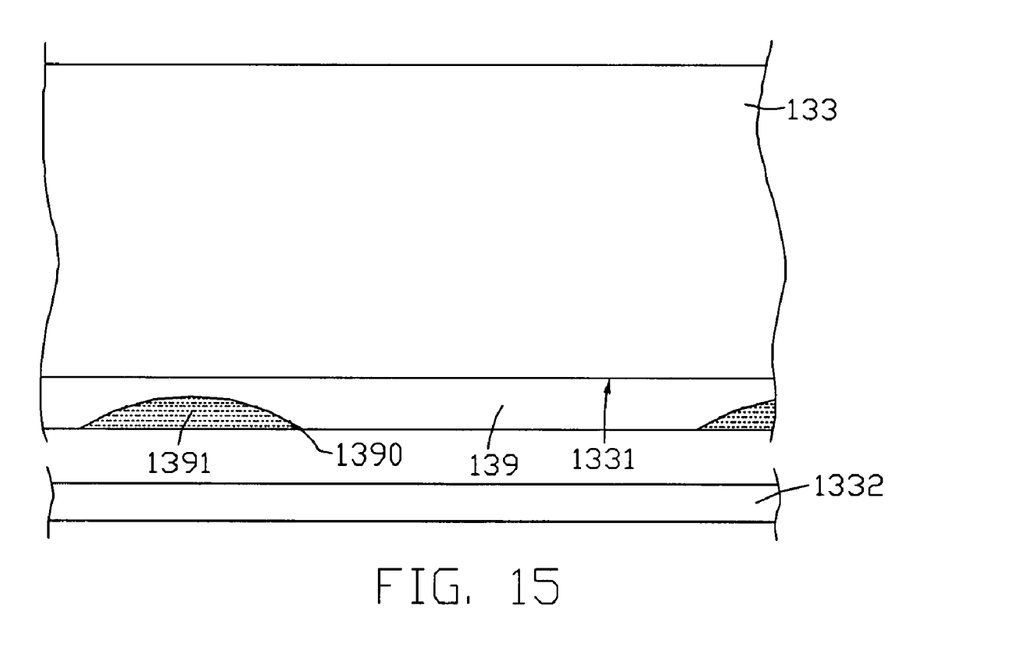
FIG. 15 is a side cross-sectional view of part of a lower glass substrate of a liquid crystal display device according to a twelfth embodiment of the present invention.

Similarly, a filling layer 1391 is formed on a lower substrate of a liquid crystal panel according to the twelfth embodiment of the present invention of FIG. 15. That is, a plurality of the arc-shaped trenches 1390 is located in a coating layer 139 and then the filling layer 139 is filled and leveled up. Therefore, a polarizer sheet 1332 is tightly adhered to an outer surface 1331 of the coating layer 139 of the lower substrate 133 and dependent on the planar adhering surfaces between thereof.

While the above description has been set out by the way of examples and in terms of preferred embodiments, it is to be understood that the invention is not limited thereto. To the contrary, the above description is intended to cover various modifications and similar arrangements, including what would be apparent to those skilled in the art. Therefore, the scope of the appended claims should be taken with the broadest interpretation so as to encompass all such modifications and similar arrangements.

What is claimed is:

1. A liquid crystal panel comprising:
   a pair of substrates;
   a liquid crystal layer disposed between the substrates; and
   a black matrix disposed on an inner surface of one of the pair of substrates; and
   a pattern aligned with the black matrix, the pattern provided at an outer surface of one of the pair of substrates;
   wherein the pattern defines a plurality of triangle-shaped trenches, each of the trenches defines a bottom angle relative to said outer surface of one of the pair of substrates, and the bottom angle is in a range of 4 degrees to 17 degrees, such that incoming light beams which pass through the trenches bypass the black matrix to emit from said one of the pair of substrates.

2. The liquid crystal panel as claimed in claim 1, further comprising a plurality of conductive lines disposed on an inner surface of the other one of the pair of substrates, wherein the conductive lines are aligned with the black matrix.

3. The liquid crystal panel as claimed in claim 1, further comprising a filling layer filling in the trenches, so as to form a planar surface at said outer surface of one of the pair of substrates.

4. The liquid crystal panel as claimed in claim 3, wherein a material of the filling layer is selected from the group consisting of fluorinated acrylic ester, methyl acrylate, and magnesium fluoride.

5. The liquid crystal panel as claimed in claim 1, further comprising a coating layer disposed at said outer surface of one of the pair of substrates, wherein the pattern is disposed at the coating layer.

6. The liquid crystal panel as claimed in claim 5, wherein a material of the coating layer is selected from the group consisting of silicon dioxide, silicon nitride, polyethylene terephthalate, polyethylene, polypropylene, polymethylmethacrylate, phosphorylcholine, polyimide, polyvinyl chloride, polystyrene, steatic acid, triacetate fiber, polymer of methylmesylate-styrene, fluorinated acrylic ester, methyl acrylate, and magnesium fluoride.

7. The liquid crystal panel as claimed in claim 1, wherein the black matrix and the pattern are provided at different of the pair of substrates.

8. A liquid crystal panel comprising:
a first substrate;
a second substrate parallel to the first substrate;
a liquid crystal layer disposed between the substrate;
a black matrix disposed on an inner surface of one of the first substrate and the second substrate;
a coating layer formed at an outer surface of the second substrate; and
a pattern formed at the coating layer, the pattern including a plurality of trenches aligned with the black matrix.

9. The liquid crystal panel as claimed in claim 8, further comprising a filling layer filling in the trenches of the pattern such that the coating layer and the filling layer cooperatively provide a planar surface at a side of the coating layer farthest from the outer surface of the second substrate.

10. The liquid crystal panel as claimed in claim 9, wherein a material of the filling layer is selected from the group consisting of fluorinated acrylic ester, methyl acrylate, and magnesium fluoride.

11. The liquid crystal panel as claimed in claim 8, wherein a material of the coating layer is selected from the group consisting of silicon dioxide, silicon nitride, polyethylene terephthalate, polyethylene, polypropylene, polymethylmethacrylate, phosphorylcholine, polyimide, polyvinyl chloride, polystyrene, steatic acid, triacetate fiber, polymer of methylmesylate-styrene, fluorinated acrylic ester, methyl acrylate, and magnesium fluoride.

* * * * *